United States Patent Office 3,711,479
Patented Jan. 16, 1973

3,711,479
PROCESS FOR SEPARATING MELAMINE FROM A HOT SYNTHESIS GAS MIXTURE WHICH CONTAINS MELAMINE VAPOR
Johannes D. M. Verstegen and Petrus J. M. van Nassau, Geleen, Netherlands, assignors to Stamicarbon N.V., Heerlen, Netherlands
Filed Apr. 1, 1971, Ser. No. 130,428
Claims priority, application Netherlands, Apr. 3, 1970, 7004765
Int. Cl. C07d 55/24
U.S. Cl. 260—249.7 P                                    5 Claims

ABSTRACT OF THE DISCLOSURE

A process for recovering melamine from hot synthesis gases containing melamine, $NH_3$ and $CO_2$ is disclosed wherein the hot synthesis gases are contacted with an aqueous solution of ammonium carbamate. The ammonium carbamate decomposes endothermically to $NH_3$ and $CO_2$ and cools the synthesis gases thereby desubliming melamine therefrom.

---

The present invention relates to a process for separating melamine from a hot synthesis gas mixture which contains melamine vapor and principally $NH_3$ and $CO_2$, in addition to the melamine. Such a gas mixture is obtained, for instance, in the preparation of melamine starting from urea. The urea is converted by heating, possibly under pressure, to a gas mixture containing melamine, ammonia and carbon dioxide according to the reaction equation:

$$6CO(NH_2)_2 \rightarrow C_3N_6H_6 + 6NH_3 + 3CO_2$$

Because this reaction is usually carried out in the presence of a catalyst and in an ammonia-containing gas stream, the synthesis gas produced will generally contain more ammonia than appears stoichiometrically from the above reaction equation. By cooling the hot reaction gases (temperature about 380° C.), it is possible to separate the melamine as solid from the remaining gases by desublimation.

The hot reaction gases can be cooled by direct contact with water or with a circulating solution of ammonium carbonate and/or bicarbonate and ammonium carbamate. The ammonium bicarbamate and ammonium carbamate can exist in dissolved condition with ammonium carbonate, with which they are in equilibrium. A diluted solution can be considered as a solution of ammonium carbonate, whereas solutions of higher concentrations can be considered as solutions of ammonium carbamate. When using water or an aqueous solution as the direct contact coolant, the melamine-freed gases contain excessive water vapor in the order of 25 weight percent. This excessive water content is objectionable when the melamine-freed gases containing ammonia and carbon dioxide are used in other processes such as, for instance, the preparation of urea.

The present invention provides a process for separating melamine from the hot, synthesis gas mixture containing melamine vapor by direct contact between the synthesis gas mixture on an ammonium carbamate solution which is kept in circulation. The melamine-free gases produced contain appreciably less water than is the case of prior art processes. Thus, the water content of the melamine-free gases produced by the present invention contain less than 20% by weight.

In the prior art processes, cooling of the hot reaction gases is effected by evaporation of water. In the process of the present invention, cooling is largely accomplished by the endothermic decomposition reaction of ammonium carbamate which is present in the solution. The endothermic reaction takes place according to the equation:

$$NH_2COONH_4 \rightarrow 2NH_3 + CO_2$$

The ammonium carbamate should be present in the cooling liquid, and to decompose, in the ratio of at least one kg. of ammonium carbamate, and by preference 1.5–5 kg. of ammonium carbamate, per kg. of melamine which is to be desublimated. The ammonium decomposes endothermically and cools the melamine synthesis gases. The melamine desublimes from the synthesis gases. After the desublimation of the melamine, the residual gases comprises the ammonia and carbon dioxide formed by the decomposition of the ammonium carbamate as well as the ammonia and carbon dioxide present in the melamine synthesis gas.

A particularly advantageous mode of operation of the process of the present invention can be accomplished by further subjecting the melamine-free gases to a partial condensation treatment with formation of an ammonium carbamate solution. The heat liberated during the partial condensation can then be utilized in the recrystallization of the raw melamine produced in the desublimation. The residual gas from the partial condensation step contains $NH_3$, $CO_2$ and some water vapor and can then be treated in a rectifying apparatus with liquid $NH_3$. In the rectifying apparatus, ammonia is separated as overheads, which may be recycled to the melamine synthesis, and a concentrated ammonium carbamate solution is obtained as bottom product, which may be used in urea synthesis. Also the heat liberated during the formation of the concentrated ammonium carbamate solution in the rectifying column can, at least in part, be recovered at a sufficiently high temperature level that it can be used as a heat source elsewhere in this process or associated processes.

There is no advantage in the recovery of the heat of condensation unless it is made available at a sufficiently high temperature level. The temperature level, in turn, depends on the pressure. For this reason, the invention provides for the partial condensation of the melamine-free gases to take place at a pressure of at least 5 atm. This can be achieved, for instance, by having the melamine synthesis and the removal of melamine from the hot, melamine vapor-containing synthesis gases take place at a pressure of at least 5 atm., or by having the melamine synthesis proper and the removal of melamine from the melamine vapor-containing synthesis gases take place at atmospheric pressure or at a pressure of less than 5 atm. and then subsequently compressing the gases, which have been freed from melamine vapor, to a pressure of, for instance, 5–15 atm. with the aid of a hot-gas compressor.

Of course, the pressure of the gases after having the melamine separated therefrom can always be increased to a higher level by a compressor, even if the melamine synthesis and the removal of melamine from the gases have taken place under pressure. By compressing the gases the heat can be recovered at a higher temperature level.

The partial condensation and rectification described above can be carried out in separate apparatus, however, the treatments can most effectively be done in one apparatus whose lower part consists of the condenser with an upper rectifying zone.

The essential feature of the present invention is that the hot gases containing melamine vapors are cooled by direct contact with an aqueous ammonium carbamate solution whereby the melamine solidifies therefrom by desublimation. The concentration of the ammonium carbamate being such that, per kg. of melamine to be desublimated, at least 1 kg., preferably 1.5–5 kg., of ammonium carbamate is present in order to substantially contribute to the cooling of the gases by an endothermic decomposition. The heat liberated during the desublimation of melamine is taken up in the endothermic decomposition of the ammonium carbamate. The gases obtained after desublimating the melamine contain less than 20 weight percent of water vapor. The residual gases remaining after the partial condensation contain less than 10 weight percent water vapor.

A preferred mode of operation of the process according to the present invention is shown schematically in the drawing. Referring to the drawing, there is shown a melamine synthesis reactor A, which is filled with catalyst particles such as silica gel. Reactor A is maintained at an elevated pressure, e.g. 10 atm. and is supplied with molten urea through line 1 and a gas stream principally consisting of $NH_3$ through line 2 and gas compressor B. A hot gas containing melamine vapor leaves reactor A, and passes through dust filter C to remove catalyst particles therefrom. This gas stream subsequently passes through the coolers, $D_1$ and $D_2$. The gas mixture passes through cooler $D_1$ in parallel flow with an aqueous solution of ammonium carbamate. The ammonium carbamate solution flows in film-wise fashion down the vertical cooling plates 15. As the ammonium carbamate endothermically decomposes to form ammonia and carbon dioxide, it cools the gas mixture containing the melamine, and the melamine desublimes therefrom. The ammonium carbamate is fed to cooler $D_1$ by line 14. The gases, which have had the melamine content removed therefrom, along with the ammonia and carbon dioxide formed in cooler $D_1$ by the decomposition of the ammonium carbamate are fed forward to cooler $D_2$ by line 3. An aqueous suspension of melamine solids is withdrawn from cooler $D_1$ and fed forward to holding tank H by pump 7. This aqueous suspension also contains dissolved ammonia, ammonium carbamate and melamine. The gases fed forward from cooler $D_1$ to cooler $D_2$ by line 3 contain less than 20% water vapor.

The gases from cooler $D_1$ are fed to cooler $D_2$ and cooled by contact with a countercurrent flow of an aqueous solution of ammonium carbamate. The ammonium carbamate solution from cooler $D_2$ is pumped by pump 6 through line 14 to cooler $D_1$. The cooled gases leaving cooler $D_2$ contain less than 15% water vapor and are fed forward by line 4 to condenser E. Condenser E is maintained at a pressure of at least 5 atmospheres and contains a cooling coil 9.

The ammonia and carbon dioxide in the gases fed to condenser E condense, along with the water vapor contained in the gases, to form an aqueous solution of ammonium carbamate. This aqueous solution of ammonium carbamate is recycled back to cooler $D_2$ by line 5. The ammonium carbamate is ultimately decomposed in cooler $D_1$ into ammonia and carbon dioxide which return to condenser E to be again condensed to ammonium carbamate. For every 1000 kg. of melamine to be desublimated to cooler $D_1$ 3000 kg. of 66 weight percent ammonium carbamate solution are recycled as cooling liquid.

The melamine suspension obtained during the cooling is introduced via pump 7 into a holding tank H, where small melamine particles dissolve and recrystallize again on larger particles. The suspension flowing from holding tank H is expanded to 1 atm. by expansion valve 8, following which the resulting mixture of solid melamine particles, solution and gas is fed to separator J. In separator J, the gase phase formed in the expansion is separated from the remaining aqueous suspension. The remaining solution saturated with melamine and containing suspended melamine particles is introduced into a cyclone thickness L, and the concentrated suspension is filtered by filter M and washed with wash water supplied through line 16. Washed melamine crystals are dsicharged via line 17 to a recrystallization section which is not shown in the drawing.

The wash water is recirculated by line 18 and combined with the overflow of thickener-cyclone 19. The wash water and overflow are pumped by 20 through line 13 and used as a cooling liquid in cooler $D_1$. Approximately one-third of this liquid from pump 20 is fed through line 21 to holding tank H for circulation via the expansion valve 8, in order to avoid an excessive temperature drop during the expansion.

The gas phase discharged from separator J is fed through line 22 to an absorption column K. In column K, the gas phase containing primarily ammonia is absorbed in water supplied via line 23 forming an aqueous ammonia solution containing a small amount of ammonium carbamate. This solution is pumped to rectifying column F by the pump 24 and line 25. The gases which are not condensed in condenser E are also fed to column F and an ammonium carbamate solution of a rather high concentration if formed. The ammonium carbamate solution is discharged via line 27, and is suitable, without removal of water, for use in urea synthesis.

The heat liberated during the condensation of the ammonium carbamate in column F is discharged, at different temperature levels, through cooling coils 10, 11 and 12. Ammonia gas is discharged from the top of column F through line 28 while liquid ammonia is introduced via line 29 into column F as a condensing agent to to remove the last traces of water from the ammonia gas being discharged. The ammonia gas from column F is fed to the melamine synthesis reactor A by line 2 and gas compressor B.

EXAMPLE

Apparatus as shown in the drawing was used to produce 1000 kg. of melamine and an ammonium carbamate according to the present invention. The melamine reactor A was supplied with 3180 kg. of urea via line 1 and with 5860 kg. of $NH_3$ via line 2. The melamine synthesis reaction was maintained at a pressure of 10 atm. and a temperature of 390° C. The synthesis gas from reactor A consisted of: 6670 kg. of $NH_3$, 1048 kg. of $CO_2$, 320 kg. of "urea" (urea which has not been converted into melamine and which is present as $NH_3HCNO$) and 1000 kg. of melamine.

This synthesis gas, a temperature of 390° C., was then fed to cooler $D_1$. A melamine suspension consisting of: 338 kg. of $NH_3$, 115 kg. of ammonium carbamate, 3270 kg. of $H_2O$, 500 kg. of melamine in dissolved form and 658 kg. of melamine in crystalline form at a temperature of 145° C. was withdrawn from cooler $D_1$ and fed to holding tank H, where the suspension was diluted with very dilute melamine suspension supplied via line 21. The dilute solution supplied by line 21 consisted of: 44 kg. of $NH_3$, 23 kg. of ammonium carbamate, 1420 kg. of $H_2O$, 47 kg. of melamine in dissolved form and 15 kg. of melamine in crystalline form and had a temperature of 85° C.

The melamine suspension was then expanded through expansion valve 8 to atmospheric pressure and fed to separator J. A suspension having a temperature of 85° C. and consisting of: 157 kg. of $NH_3$, 80 kg. of ammonium carbamate, 4397 kg. of $H_2O$, 145 kg. of melamine in dissolved form and 1095 kg. of melamine in crystalline form was discharged from separator J and fed to the thickener-cyclone L.

A thickened suspension consisting of: 60 kg. of $NH_3$, 30 kg. of ammonium carbamate, 1674 kg. of $H_2O$, 55 kg. of melamine in dissolved form and 1021 kg. of melamine in crystalline form was discharged at the bottom of the thickener-cyclone.

This suspension was subsequently filtered and 1000 kg. of melamine were recovered. 624 kg. of wash water were fed to filter M by line 16 while 2298 kg. of water, in which were dissolved: 60 kg. of $NH_3$, 30 kg. of ammonium carbamate and 76 kg. of melamine, were returned, together with the overflow of thickener-cyclone L by pump 20 to cooler $D_1$ and holding tank H. 3611 kg. of this solution containing: 113 kg. of $NH_3$, 57 kg. of ammonium carbamate and 158 kg. of melamine was fed to the cooler $D_1$, as cooling liquid, having a temperature of 85° C.

The gas phase discharged from the separator J consisted of: 250 kg. of $NH_3$, 33 kg. of $CO_2$ and 283 kg. of $H_2O$. The gas phase from separator was fed to absorption column K. Addition of 377 kg. of water to column K was made through line 23 and an ammonia solution of about 25 weight percent which contained 6 weight percent of ammonium carbonate or ammonium carbamate was discharged at a temperature of 35° C. from column K by pump 24 and line 25 and fed to column F.

The melamine-free gas phase leaving the cooler $D_2$ having a temperature of 115° C. and a composition of: 7621 kg. of $NH_3$, 2153 kg. of $CO_2$ and 1235 kg. of $H_2O$ was introduced into condenser E. The gas phase was cooled to a temperature of 93° C. and partial condensation resulted in a concentrated ammonium carbamate solution consisting of: 326 kg. of $NH_3$, 1597 kg. of ammonium carbamate and 990 kg. of $H_2O$, which was recycled as cooling liquid by line 5 to column $D_2$.

The residual gases which were not condensed in condenser E consisted of: 6601 kg. of $NH_3$, 1250 kg. of $CO_2$ and 295 kg. of $H_2O$. These gases were fed to column F by line 26. These gases are condensed in column F and the gases ascending through the column become impoverished in $CO_2$ to an increasing degree. Ultimately, a concentrated ammonium carbamate solution, consisting of: 304 kg. of $NH_3$, 2270 kg. of ammonium carbamate and 905 kg. of $H_2O$, whose temperature was 90° C. was discharged through line 27 to a urea synthesis process. 5860 kg. of ammonia gas escaped from the top of the column via line 28. Liquid ammonia was fed to column F as condensing agent in a quantity of 300 kg. Heat of condensation is discharged from column F at different temperature levels using the liquids passed through cooling coils 10, 11 and 12. In the bottom part of the column, the temperature amounts to approximately 90° C. in the middle part to about 60° C. and at the top to 47° C. The heat discharged from condenser E and from the bottom of condenser F was at a sufficiently high temperature level that solutions of raw melamine was passed through the cooling coils and heated thereby, following which the solutions were led into a vacuum-evaporator where melamine crystallized.

What is claimed is:

1. A process for separating melamine from a hot synthesis gas mixture containing melamine vapor, ammonia and carbon dioxide, said process comprising direct contact of the synthesis gas mixture with an aqueous solution containing ammonia and carbon dioxide in free or bound condition and at least 1 kg. of ammonium carbamate per kg. of melamine, whereby the ammonium carbamate is decomposed endothermically into ammonia and carbon dioxide and cools said synthesis gas to desublime melamine therefrom.

2. A process according to claim 1 wherein from 1.5 to 5 kg. of ammonium carbamate is present per kg. of melamine.

3. A process according to claim 1, characterized in that the melamine-free gas mixture obtained is further partial condensed under a pressure of at least 5 atm. into a residual gas and a concentrated, aqueous, ammonium carbamate solution with the ammonium carbamate solution so produced being used as the aqueous solution used to cool and desublime the melamine from the synthesis gas mixture.

4. A process according to claim 2, characterized in that the non-condensed, residual gas contains $NH_3$, $CO_2$ and less than 10 weight percent of water.

5. A process according to claim 3, characterized in that the liberated heat of condensation is used to heat solutions of raw melamine from which pure melamine is recovered by recrystallization.

References Cited

UNITED STATES PATENTS

| | | | |
|---|---|---|---|
| 3,308,123 | 3/1967 | Murata et al. | 260—249.7 |
| 3,544,628 | 12/1970 | Hsu | 260—249.7 |
| 3,547,919 | 12/1970 | Hamprecht | 260—249.7 |

JOHN M. FORD, Primary Examiner